US012110771B2

(12) United States Patent
Ritchie et al.

(10) Patent No.: US 12,110,771 B2
(45) Date of Patent: Oct. 8, 2024

(54) GAS LIFT VALVE REMANUFACTURING PROCESS AND APPARATUS PRODUCED THEREBY

(71) Applicant: TRC Services, Inc., The Woodlands, TX (US)

(72) Inventors: Russell L. Ritchie, Adkins, TX (US); Stanley Wayne Sweet, New Braunfels, TX (US); Dustin Wayne Lott, Katy, TX (US); Gustavo Pertuz, Katy, TX (US)

(73) Assignee: TRC SERVICES, INC., The Woodlands, TX (US)

( * ) Notice: Subject to any disclaimer, the term of this patent is extended or adjusted under 35 U.S.C. 154(b) by 86 days.

(21) Appl. No.: 18/107,603

(22) Filed: Feb. 9, 2023

(65) Prior Publication Data

US 2023/0258061 A1 Aug. 17, 2023

Related U.S. Application Data

(60) Provisional application No. 63/309,708, filed on Feb. 14, 2022.

(51) Int. Cl.
*E21B 43/12* (2006.01)
*B23K 9/235* (2006.01)
*B23K 101/10* (2006.01)

(52) U.S. Cl.
CPC ............ *E21B 43/123* (2013.01); *B23K 9/235* (2013.01); *B23K 2101/10* (2018.08); *Y10T 137/2934* (2015.04)

(58) Field of Classification Search
CPC . Y10T 137/2934; E21B 43/123; B23K 9/235; B23K 2101/10
See application file for complete search history.

(56) References Cited

U.S. PATENT DOCUMENTS 3,375,846 A   4/1968   Canalizo
3,403,694 A   10/1968  Brown
(Continued)

FOREIGN PATENT DOCUMENTS

CA   848246 A     8/1970
EP   2554787 A2   2/2013
(Continued)

OTHER PUBLICATIONS

Alloy Bellows & Precision Welding, "Next-Generation Bellows for Artificial Gas-Lift Systems," Brochure, undated, obtained from alloyprecisiontech.com/wp-content/uploads/, 2-pgs.
(Continued)

*Primary Examiner* — Craig M Schneider
*Assistant Examiner* — Frederick D Soski
(74) *Attorney, Agent, or Firm* — Cabello Hall Zinda, PLLC

(57) ABSTRACT

Used gas lift valves having a used bellows assembly are remanufactured. Separable components are disassembled, and the used bellows assembly is removed from a dome housing by de-brazing the used bellows at a brazed joint from a mating surface of the dome housing. A replacement bellows is then affixed (e.g., arc welded) to the dome housing's mating surface, and a bellows adapter is affixed (e.g., arc welded) to the replacement bellows. The separable components of the used valve are then reassembled to produce a remanufactured gas lift valve. The remanufactured valve has a replacement bellows composed of a nickel-chromium alloy as opposed to a nickel-copper alloy, has the replacement bellows arc-welded to the dome housing as opposed to being brazed thereto, and has the adapter arc-welded to the bellows as opposed to being brazed thereto.

21 Claims, 12 Drawing Sheets

(56) References Cited

U.S. PATENT DOCUMENTS

| | | | | |
|---|---|---|---|---|
| 3,601,191 | A | * | 8/1971 | McMurry ............. E21B 43/123 |
| | | | | 417/115 |
| 5,731,567 | A | * | 3/1998 | Kato ...................... B23K 9/235 |
| | | | | 219/136 |
| 7,228,909 | B2 | | 6/2007 | Schmidt et al. |
| 7,370,706 | B2 | | 5/2008 | Becker et al. |
| 9,010,353 | B2 | | 4/2015 | Salihbegovic |
| 9,587,463 | B2 | | 3/2017 | Tveiten et al. |
| 10,161,232 | B2 | | 12/2018 | Salihbegovic et al. |
| 2005/0189107 | A1 | | 9/2005 | McVay et al. |
| 2013/0312833 | A1 | | 11/2013 | Salihbegovic |
| 2014/0069659 | A1 | | 3/2014 | Wang et al. |
| 2016/0053582 | A1 | * | 2/2016 | Payne .................. E21B 47/017 |
| | | | | 166/243 |
| 2018/0149001 | A1 | | 5/2018 | Kleppa et al. |
| 2021/0270112 | A1 | * | 9/2021 | Mazzanti ............. E21B 43/121 |

FOREIGN PATENT DOCUMENTS

| | | | |
|---|---|---|---|
| EP | 2581551 | A2 | 4/2013 |
| EP | 2666957 | A3 | 4/2015 |
| GB | 2321071 | A | 7/1998 |

OTHER PUBLICATIONS

Apergy, "Gas Lift Valve Catalog," Catalog, undated, obtained from apergyals.com on Dec. 20, 2021, 28-pgs.

Flowco, "Gas Lift: Application Guide," Catalog, file dated 2018, btained from flowcosolutions.com on Dec. 20, 2021, 15-pgs.

Murray, A., "Considerations for Next Generation Artificial Lift Bellows," Presentation, obtained from alrdc.org/workshops/2019_2019GasLiftWorkshop, 16-pgs.

Saz Oilfield Services, "Gas Lift System," Catalog, undated, obtained from sazoil.com on Dec. 20, 2021, 4-pgs.

Senior Flexonics, "Artificial/Gas Lift Bellows," webpage obtained from www.seniorflexonicsusa.com/artificial-gas-lift-bellows/, copyright 2021, 2-pgs.

Weatherford, "Gas-Lift Equipment Catalog," Catalog, copyright 2007-2014, 100-pgs.

International Search Report and Written Opinion in PCT Appl. mailed Aug. 14, 2023, 13-pgs.

* cited by examiner

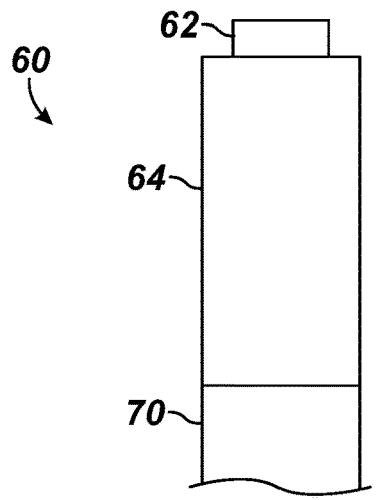
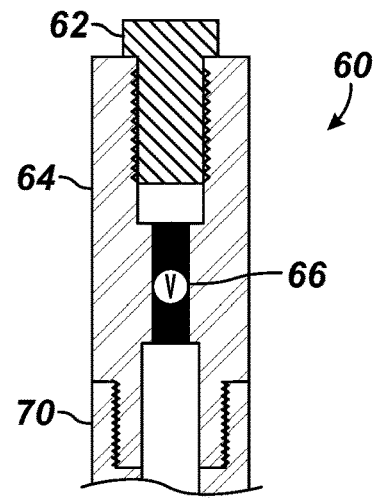
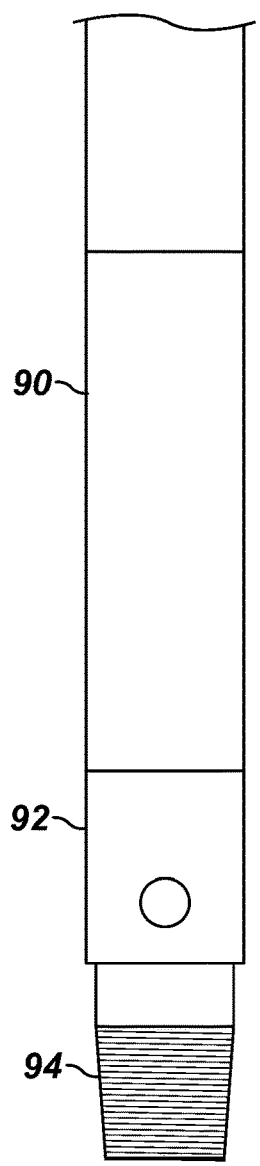
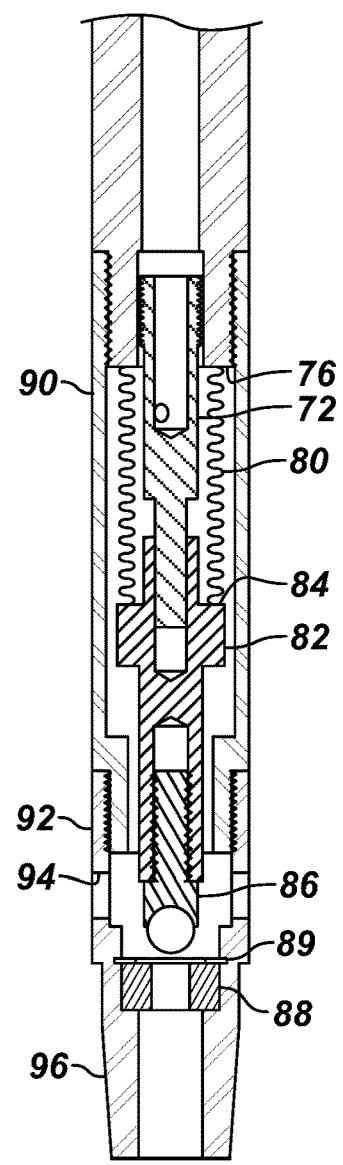
FIG. 6A
FIG. 6B

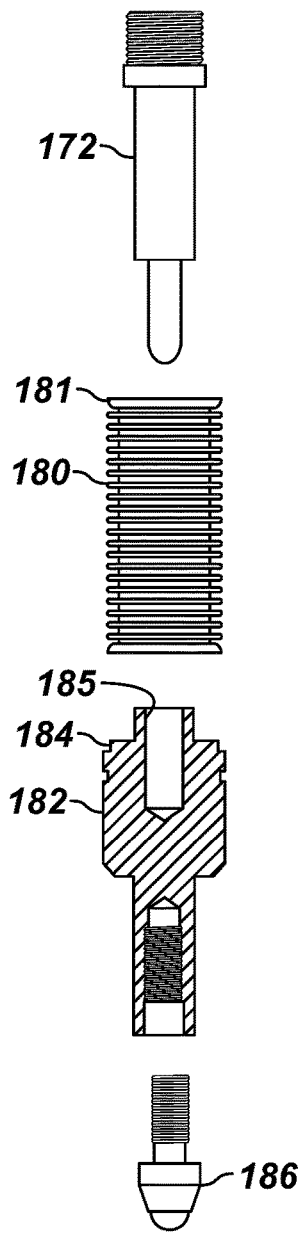
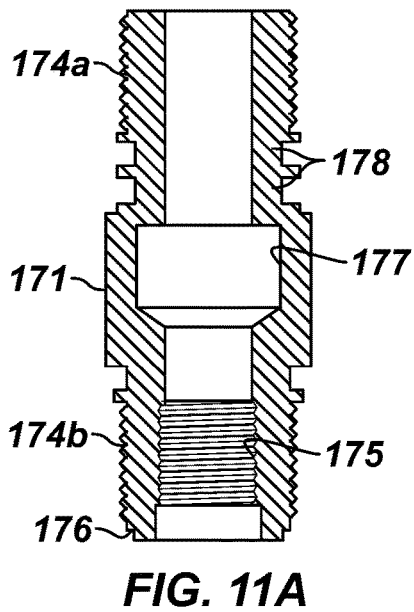
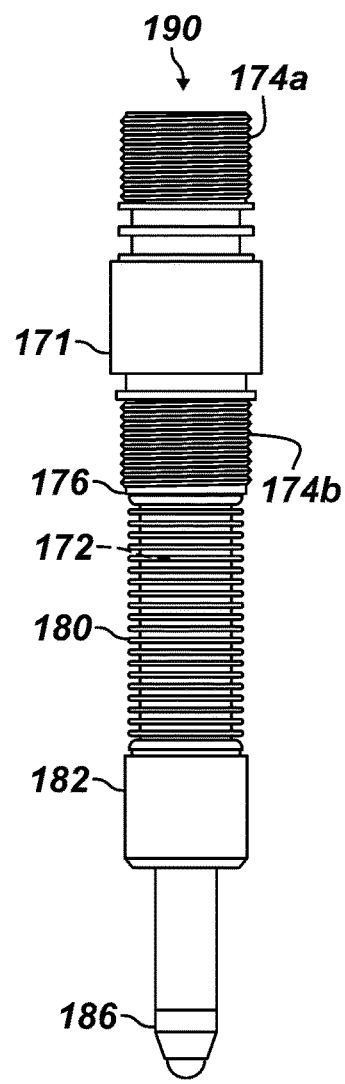
FIG. 10
FIG. 11A
FIG. 11B

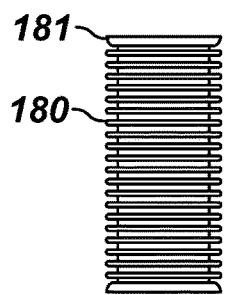
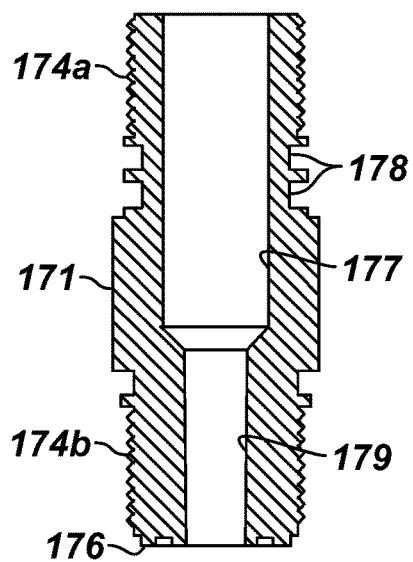
FIG. 14B
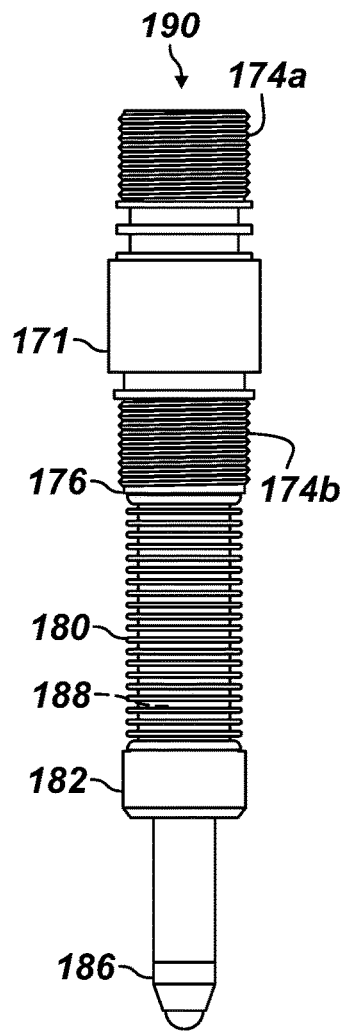
FIG. 14C
FIG. 14A

GAS LIFT VALVE REMANUFACTURING PROCESS AND APPARATUS PRODUCED THEREBY

CROSS-REFERENCE TO RELATED APPLICATIONS

This application claims the benefit of U.S. Provisional Appl. No. 63/309,708 filed Feb. 14, 2022, which is incorporated herein by reference in its entirety.

BACKGROUND OF THE DISCLOSURE

To obtain hydrocarbon fluids from an earth formation, a wellbore is drilled into an area of interest within a formation. The wellbore may then be "completed" by inserting casing in the wellbore and setting the casing using cement. Alternatively, the wellbore may remain uncased as an "open hole"), or it may be only partially cased. Regardless of the form of the wellbore, production tubing is run into the wellbore to convey production fluid (e.g., hydrocarbon fluid, which may also include water) to the surface.

Often, the pressure within the wellbore is insufficient to cause the production fluid to naturally rise through the production tubing to the surface. In these cases, an artificial lift system can be used to carry the production fluid to the surface. One type of artificial lift system is a gas lift system, of which there are two primary types of systems: tubing-retrievable gas lift systems and wireline-retrievable gas lift systems. Each type of gas lift system uses several gas lift valves spaced along the production tubing. The gas lift valves allow gas to flow from the annulus into the production tubing so the gas can lift production fluid in the production tubing. Yet, the gas lift valves prevent fluid to flow in the opposite direction from the production tubing into the annulus.

A typical wireline-retrievable gas lift system 10 is shown in FIG. 1. Operators inject compressed gas G into the annulus 22 between a production tubing string 20 and the casing 24 within a cased wellbore 26. A valve system 12 supplies the injection gas G from the surface and allows produced fluid to exit the gas lift system 10.

Side pocket mandrels 30 spaced along the production string 20 hold gas lift valves 40 within side pockets 32. As noted previously, the gas lift valves 40 are one-way valves that allow gas flow from the annulus 22 into the production string 20 and prevent reverse flow from the production string 20 into the annulus 22.

A production packer 14 located on the production string 20 forces the flow of production fluid P from a formation up through the production string 20 instead of up through the annulus 22. Additionally, the production packer 14 forces the gas flow from the annulus 22 into the production string 20 through the gas lift valves 40.

In operation, the production fluid P flows from the formation into the wellbore 26 through casing perforations 28 and then flows into the production tubing string 20. When it is desired to lift the production fluid P, compressed gas G is introduced into the annulus 22, and the gas G enters from the annulus 22 through ports 34 in the mandrel's side pockets 32. Disposed inside the side pockets 32, the gas lift valves 40 control the flow of injected gas I into the production string 20. As the injected gas I rises to the surface, it helps to lift the production fluid P up the production string 20 to the surface.

Gas lift valves 40 have been used for many years to assist the production of fluid to the surface. Once run downhole, the valves 40 control the injection of compressed natural gas into the production stream, aiding in the recovery of hydrocarbons. The valve 40 uses a pressure-sensitive valve mechanism having a metal bellows and a piston to convert pressure into movement. Injected gas acts on the bellows to open the pressure-sensitive valve mechanism, and the gas passes through the valve 40 into the tubing string. As differential pressure is reduced on the bellows, the valve mechanism in the valve 40 can close.

Two types of gas lift valve 40 use bellows. One type uses a non-gas charged, atmospheric bellows and requires a spring to close the valve mechanism. The other type of valve 40 uses an internal gas charge, usually nitrogen, in a volume dome to provide a closing force on the bellows. In both valve configurations, a pressure differential on the bellows from injected high-pressure gas opens the valve mechanism. In the case of a valve having the non-gas charged bellows, the atmospheric bellows is subjected to high differential pressures when the valve 40 is installed in a well and can be exposed to high operating gas injection pressure. By contrast, a valve having the gas-charged bellows is subject to high internal bellows pressure during setting and prior to installation. Yet, once the gas-charged valve is installed, the differential pressure across the bellows is less than in the non-gas charged bellows during the operation of the valve.

A gas lift valve 40 having a gas-charged bellow is shown in FIG. 2. This valve 40 is a type that installs inside a side pocket mandrel and can be retrieved using wireline or the like. Another type of gas lift valve is tubing retrievable and has to be retrieved with the tubing, but it shares many similarities with this gas lift valve 40. As shown, the gas lift valve 40 has upper and lower seals 44*a-b* separating a valve port 46, which is in communication with injection gas ports 48. A valve piston 52 is biased closed by a gas charge dome 50 and a bellows assembly 56, which can be a convoluted bellows or an edge-welded bellows system. At its distal end, the valve piston 52 moves relative to a valve seat 54 at the valve port 46 in response to pressure on the bellows 56 from the gas charge dome 50. A predetermined gas charge applied to the dome 50 and the bellows assembly 56 biases the valve piston 52 against the valve seat 54 and close the valve port 46.

A check valve 58 in the gas-lift valve 40 is positioned downstream from the valve piston 52, the valve seat 54, and the valve port 46. The check valve 58 keeps the flow from the production string (not shown) from going through the injection ports 48 and back into the casing (annulus) through the valve port 46. Yet, the check valve 58 allows injected gas from the valve port 46 to pass out the gas injection ports 48.

As the gas lift valve 40 operates downhole, the bellows 56 cycles many times and may become weak or damaged. It is not known how many times the bellows 56 may have been cycled or whether there is hidden damage. For this reason, the bellows 56 can be a major failure point for the gas lift valve 40. In light of this, many operators will not re-run a used gas lift valve, which means the operators purchase new equipment for each well. In fact, current gas lift valves 40 do not allow for the easy replacement of the bellows.

For this reason, used gas lift valves, such as the one described above, are not currently remanufactured in the industry. Instead, valve manufacturers and services companies may refurbish used gas lift valves for reuse by cleaning/polishing the valves and replacing a few minor components. For example, the lower stem and the seat may be replaced in the valve. The valve can also be recharged for calibration. The refurbishment process neglects to address some key vulnerabilities to the service life of the gas lift valve, such as how many times the original bellows has been cycled or whether the original bellows is in good working order. As a result, refurbished gas lift valves still have reliability issues. Overall, the industry treats gas lift valves as disposable components, and the only option available other than refurbishment is to purchase a new gas lift valve from a valve manufacturer.

The subject matter of the present disclosure is directed to overcoming, or at least reducing the effects of, one or more of the problems set forth above.

SUMMARY OF THE DISCLOSURE

A method is disclosed herein to remanufacture a used gas lift valve. The used gas lift valve has a used bellows assembly, which includes a used bellows brazed to a dome housing and includes a used bellows adapter brazed to the used bellows. In the method, separable components of the used gas lift valve are disassembled. The disassembled separable components can be inspected for disqualifying damage and replacing accordingly. An existing pressure valve can be removed from the dome housing so a replacement pressure valve can be installed in the dome housing.

In the method, the used bellow assembly is removed from the dome housing by de-brazing the used bellows at a brazed joint from a mating surface of the dome housing. For example, de-brazing the used bellows at the brazed joint can include heating the brazed joint using an induction heating coil centered thereabout.

In the method, a replacement bellows is affixed to the mating surface of the dome housing in a first affixing process, and the replacement bellows is affixed to a mating surface of a bellows adapter in a second affixing process. The first affixing process can be the same as or different from the second affixing process. In fact, the two affixing processes can be performed at separate steps or in conjunction with one another as appropriate.

Affixing the replacement bellows to the mating surface of the dome housing in the first affixing process can include one of: brazing the replacement bellows to the mating surface of the dome housing in a brazing process for the first affixing process; fusion welding the replacement bellows to the mating surface of the dome housing in a fusion welding process for the first affixing process, and arc welding the replacement bellows to the mating surface of the dome housing in an arc welding process for the first affixing process.

For example, arc welding the replacement bellows to the mating surface of the dome housing can include replacing the used bellows composed of a nickel-copper alloy by selecting the replacement bellows composed of a nickel-chromium alloy. To arc weld the replacement bellows to the mating surface of the dome housing, a gas tungsten arc welding (GTAW) or a tungsten inert gas (TIG) welding process can be performed circumferentially around an end of the replacement bellows and the mating surface of the dome housing.

To affix the replacement bellows to the mating surface of the dome housing, the mating surface of the dome housing can be initially refaced in a lathe. The used bellows adapter can also be replaced with a replacement bellows adapter, although the used bellows adapter can be reused if the mating surface is refaced.

Affixing the replacement bellows to the mating surface of the bellows adapter in the second affixing process can include one of: brazing the replacement bellows to the mating surface of the bellows adapter in a brazing process for the first affixing process; fusion welding the replacement bellows to the mating surface of the bellows adapter in a fusion welding process for the first affixing process, and arc welding the replacement bellows to the mating surface of the bellows adapter in an arc welding process for the first affixing process.

For example, arc welding the replacement bellows to the mating surface of the bellows adapter can include performing a gas tungsten arc welding (GTAW) or a tungsten inert gas (TIG) welding process circumferentially around an end of the replacement bellows and the mating surface of the bellows adapter.

In the method, the separable components of the used gas lift valve are then reassembled. When reassembling, elastomeric seals for connections of the separable components can be replaced. Additionally, a replacement stem can be installed on the bellows adapter, and a used seat in the gas lift valve can be replaced with a replacement seat.

In the method, an end can be truncated from the existing dome housing, and a housing adapter can be affixed to the truncated end. For example, internal thread can be formed in the truncated end of the dome housing, and the housing adapter can thread to the internal thread in the truncated end. The housing adapter has the mating surface of the dome housing for affixing of the replacement bellows.

The method can then involve pressure testing the reassembled gas lift valve to a pressure test level. The method can also involve initially determining that the used gas lift valve is suited for remanufacture or refurbishment.

As disclosed herein, a used gas lift valve is remanufactured by a method outlined above. The remanufactured gas lift valve at least includes a dome housing; a replacement bellows, and a bellows adapter. The replacement bellows can be composed of a nickel-chromium alloy. The replacement bellows is affixed at one end to the dome housing. Preferably, arc welding, such as TIG welding, can be used. The original bellows adapter can be reused, or a replacement bellows adapter can be used in the remanufacture gas lift valve. The bellows adapter is affixed to another end of the bellows. For example, arc welding, such as TIG welding, can be used.

A replacement assembly is disclosed herein for remanufacture of a used gas lift valve. The replacement assembly comprises a housing adapter, a bellows, and a bellows adapter. The housing adapter has a bore therethrough and has first and second ends. The first end has first external thread configured to thread to a dome housing component of the used gas lift valve. The second end has second external thread and has a first mating surface. The second external thread is configured to another housing component of the used gas lift valve. A first mating end of the bellows is affixed to the first mating surface of the housing adapter, and the bellows adapter is affixed to the second mating end of the bellows.

In one arrangement, the housing adapter can have a cushion rod threaded to an internal thread of the bore. The cushion rod extends beyond the second end of the housing adapter, and the bellows is disposed about the cushion rod. The cushion rod is configured to insert at least partially in an opening of the bellows adapter.

In another arrangement, the bellows adapter can have a cushion rod extending therefrom. The bellows is disposed about the cushion rod, and the cushion rod is configured to insert at least partially in the bore of the housing adapter.

The foregoing summary is not intended to summarize each potential embodiment or every aspect of the present disclosure.

BRIEF DESCRIPTION OF THE DRAWINGS

FIGS. 6A-6B illustrate an elevational view and a cross-sectional view of a used gas lift valve for processing according to the present disclosure.

FIG. 10 illustrates a replacement subassembly having a cushion rod, a bellows adapter, a bellows, and a ball and stem assembly.

FIG. 11A illustrates a cross-sectional view of an intermediate dome housing adapter.

FIG. 11B illustrates another subassembly having an intermediate dome housing adapter, a cushion rod, a bellows adapter, a bellows, a ball, and a stem assembly.

FIG. 14A illustrates a replacement subassembly having a cushion rod, a bellows adapter, a bellows, and a ball and stem assembly.

FIG. 14B illustrates a cross-sectional view of another dome housing adapter.

FIG. 14C illustrates another subassembly having an intermediate dome housing adapter, a cushion rod, a bellows adapter, a bellows, a ball, and a stem assembly.

DETAILED DESCRIPTION OF THE DISCLOSURE

Figure 1:
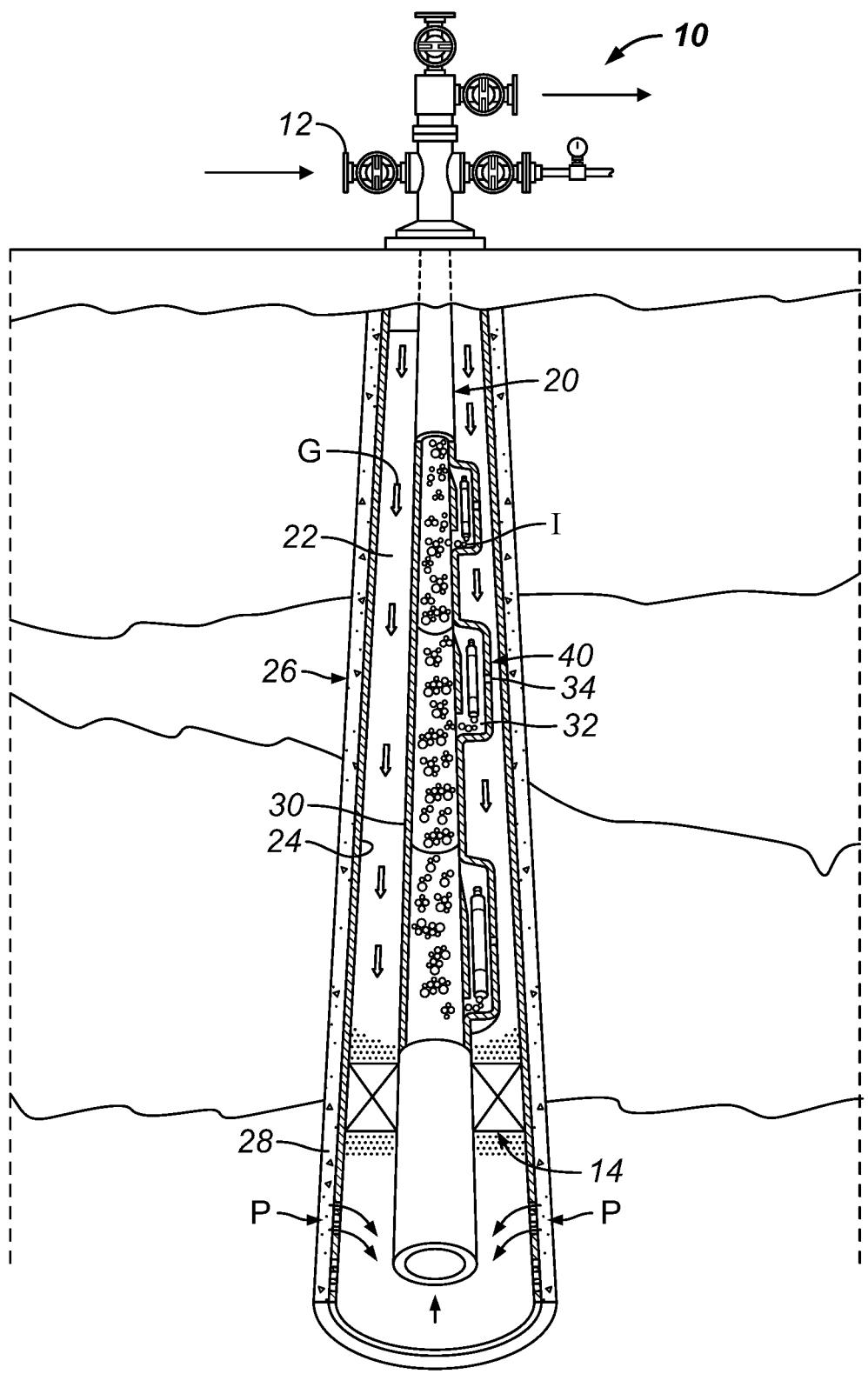
FIG. 1 illustrates a conventional gas lift system.
Figure 2:
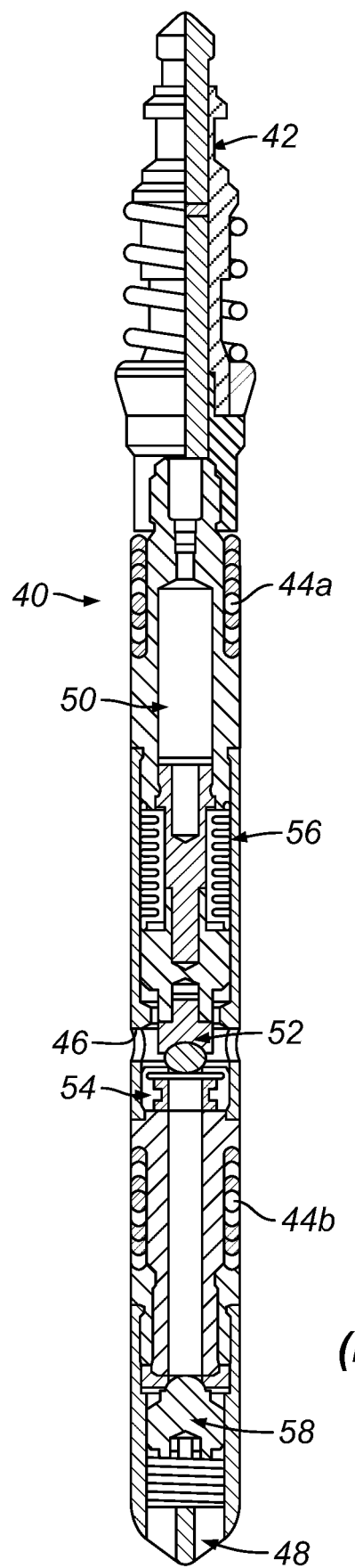
FIG. 2 illustrates a cross-sectional view of a conventional gas lift valve.
Figure 3:
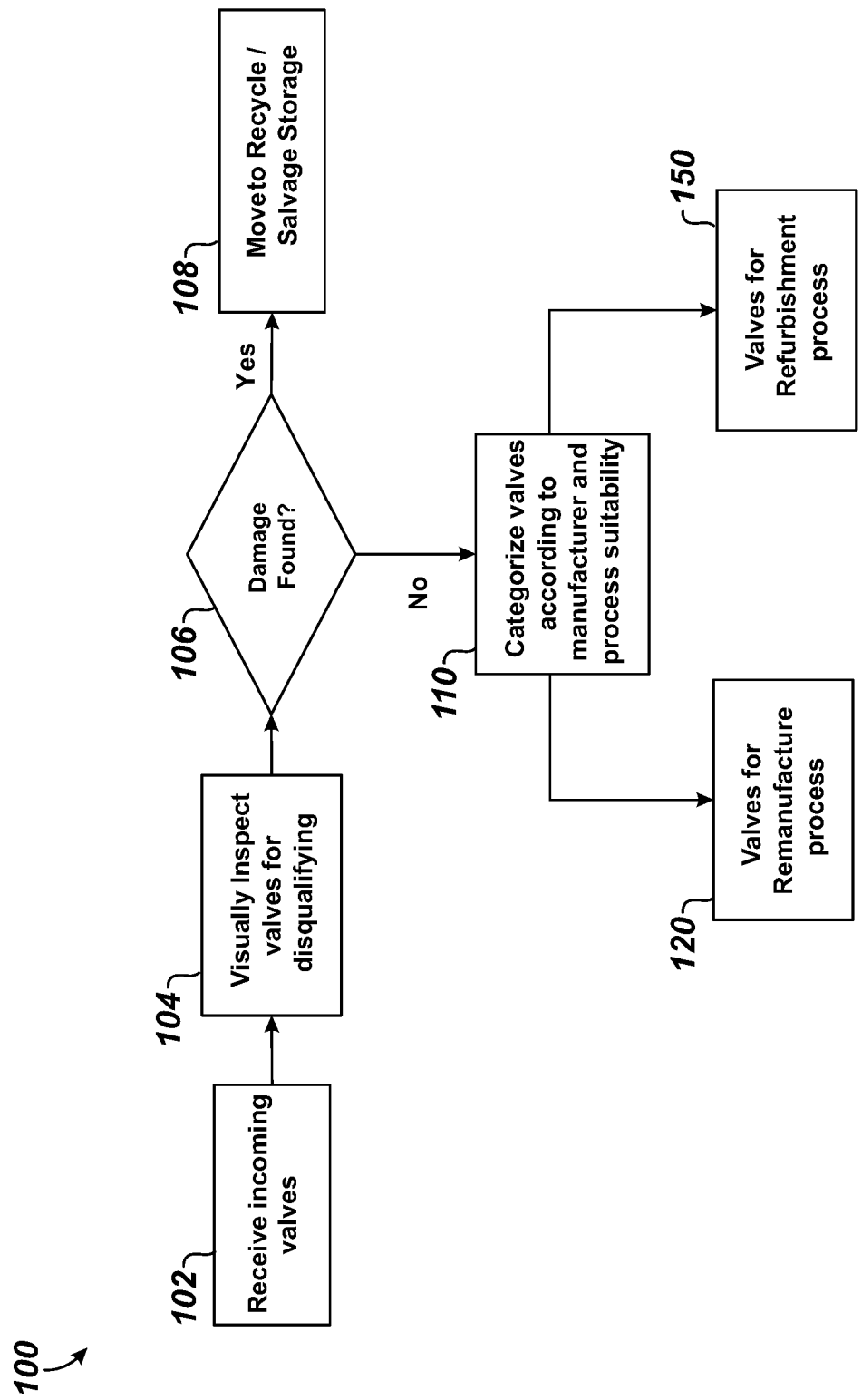
FIG. 3 illustrates a process of vetting used gas lift valves for possible remanufacture or refurbishment.

FIG. 3 illustrates a process 100 of vetting used gas lift valves for possible remanufacture or refurbishment. For discussion, reference is made to various valve components of a gas lift valve 60 as shown in FIGS. 6A through 9C. Briefly and as best shown in FIGS. 6A-6B, the used gas lift valve 60 includes a tail plug 62, a dome cap 64, a pressure valve 66, a dome housing 70, a cushion rod 72, a bellows 80, a bellows adapter 82, a stem 86, a seat 88, a bellows housing 90, and a seat housing 92. The example gas lift valve 60 shown here is a tubing-retrievable valve, but the teachings of the present disclosure will apply to other types of gas lift valves having bellows.

As shown in the process 100 of FIG. 3, used gas lift valves 60 are received for inspection (Block 102) and are visually inspected for disqualifying damage (Block 104). The incoming valves 60 are used equipment that has been retrieved from a downhole environment so various forms of damage, fouling, and wear may be present. If disqualifying damage is found (Decision 106), the used gas lift valve 60 is moved to recycle/salvage storage (Block 108). As will be appreciated, certain forms of damage, such as washout of threads, cracking, excessive wear, and the like may prevent remanufacture or refurbishment of the used gas lift valve 60.

If no disqualifying damage is found, the used gas lift valve 60 is categorized according to the manufacturer and its suitability for remanufacture or refurbishment (Block 110) to determine whether the used valve 60 is suited for a remanufacture process (Block 120) or for a refurbishment process (Block 150). The used gas lift valves 60 suited for remanufacture include those valve 60 that are compatible with the replacement bellows and any other components (e.g., bellows adapter, seals) to be replaced in the remanufacture process.

By contrast, the used gas lift valves 60 suited for refurbishment includes those valves 60 that are incompatible for whatever reason with the replacement bellows, seals, and any other components to be used in the remanufacture process. These replacement components used in the remanufacture process need to match particular criteria for the given gas lift valve design. The criteria include, but are not restricted to, API qualifications and overall valve performance considerations. For example, some of the used gas lift valves 60 may have specifications that are outside of the specifications of the replacement components so those used valves 60 would instead be evaluated for refurbishment. To qualify for refurbishment, the used valve 60 needs to be free of major defects to the dome housing 70, bellows 80, bellows adapter 82, and bellows housing 90 with extra emphasis on the bellows 80 and dome housing 70. All of the used components are thoroughly inspected to ensure serviceability and proper function.

Figure 4:
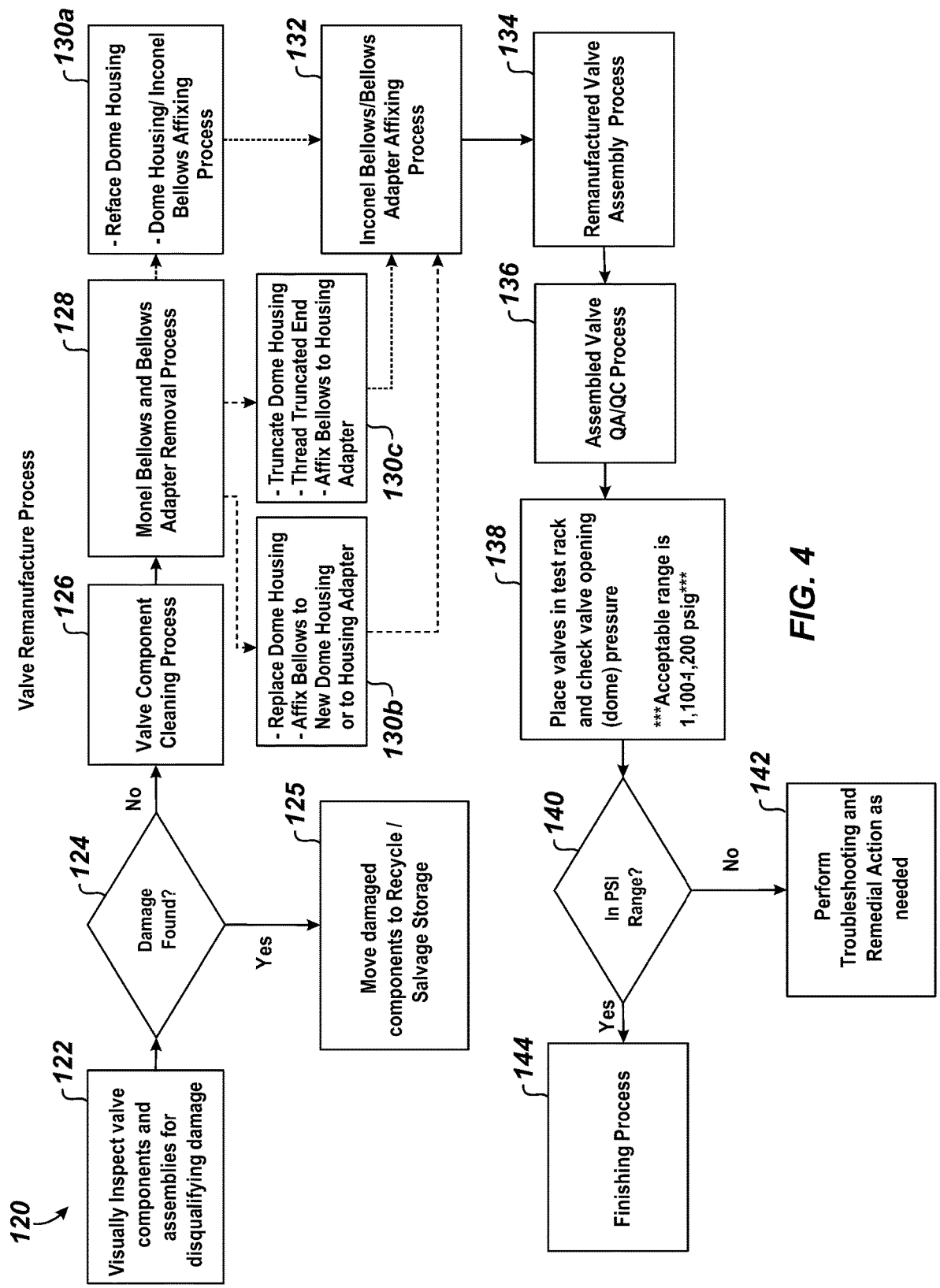
FIG. 4 illustrates a process of disassembling and remanufacturing a used gas lift valve.

FIG. 4 illustrates a process 120 of disassembling and remanufacturing a used gas lift valve 60. The used gas lift valve 60 goes through a disassembly process (Block 122). Here, the tail plug 62 is removed so that the copper crush ring 63b can be removed and placed in a recycling container and the elastomeric seal 63a can be discarded.

The dome pressure in the dome housing 70 is discharged by depressing the pressure valve 66 inside the dome cap 64. The pressure valve 66 can be a Schrader valve, a poppet valve, or the like. The Schrader valve 66 is then removed and discarded, and the dome cap 64 is removed from the dome housing 70. The seat housing 92 is removed from the bellows housing 90. The snap ring 89 and the seat 88 are removed from the seat housing 92 and placed in a recycling container. The bellows housing 90 is removed from the dome housing 70, and the elastomeric seals 65 are removed from the dome cap 64, the dome housing 70, and the bellows housing 90 and are discarded.

The valve components and assemblies are now all visually inspected for disqualifying damage in more detail (Decision 124). If damage is found, the damaged components are moved to recycle/salvage storage (Block 125). For those components that do not have disqualifying damage, the valve components go through a cleaning process (Block 126). The components are degreased in a parts washer, placed in a wash bath to remove any residue, and undergo a bead/media blast application.

Figure 8:
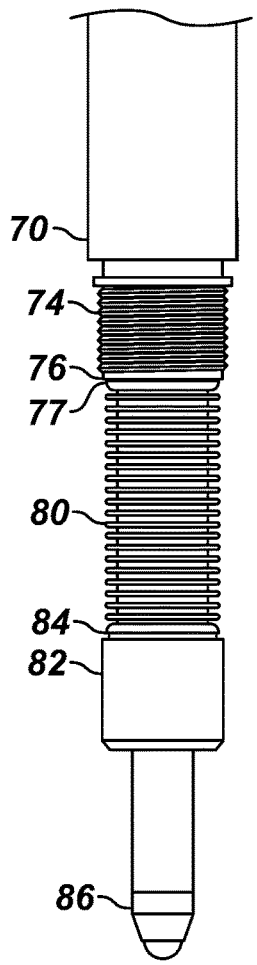
FIG. 8 shows a used assembly having a dome housing, a bellows, and a bellows adapter from the used gas lift valve.
Figure 9A:
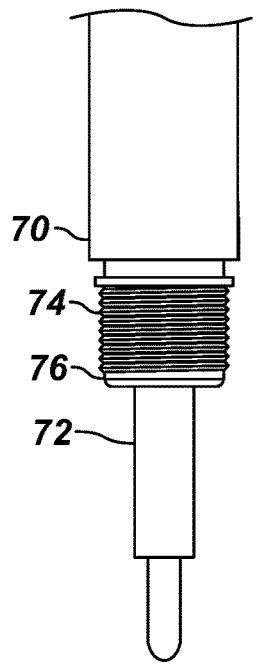
FIG. 9A shows the dome housing with the bellows removed.
Figure 9B:
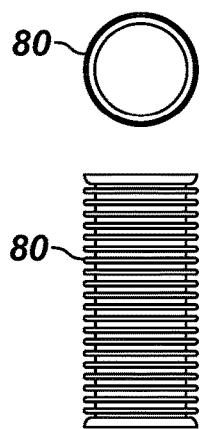
FIG. 9B shows a side view and an end view of the removed bellows.
Figure 9C:
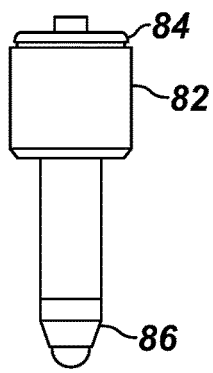
FIG. 9C shows the bellows adapter removed from the bellows.

Once the components are cleaned, the bellows 80 and bellows adapter 82 are removed from the dome housing 70 (Block 128). (FIG. 8 shows a used assembly having a dome housing 70, a bellows 80, and a bellows adapter 82 ready for disassembly.) To do the disassembly, the dome housing 70 is secured in a fixture. The bellows 80 and bellows adapter 82 are centered to an induction heater coil (not shown) and are lowered through the coil. The induction heater coil is centered on the brazed joint 77 that connects the end of the bellows 80 to a mating surface 76 of the dome housing 70. Flux is applied to the brazed joint 77 between the dome housing 70 and the bellows 80, and the induction heating coil is activated to heat the brazed joint 77. The heat can reach 1,205 to 1,880-deg F. to liquefy a typical brazing filler material. The bellows 80 and the bellows adapter 82 are then removed from the dome housing 70.

The bellows 80 is placed in a recycling container. If desired, the bellows adapter 82 can be removed from the used bellows 80 for reuse, or a replacement bellows adapter 82 can be used instead later in reassembly. Finally, the dome housing 70 is removed from the fixture and is allowed to cool.

With the old bellows 80 removed, one possible step (Block 130*a*) involves refacing the existing dome housing 70 to remove any residual brazing material and attaching or affixing a replacement bellows 180 to the refaced dome housing 70. (FIG. 10 illustrates a replacement bellows 180, a replacement bellows adapter 182, a replacement stem 186, and a replacement cushion rod 172.)

The replacement bellows 180 can be affixed in a number of ways to the dome housing 70, including brazing, fusion welding, arc welding, and other affixing process. For example, a brazing process similar to that used in the original manufacture of a gas lift valve can be used to affix the replacement bellows 180 to the dome housing 70. In contrast to using brazing, the replacement bellows 180 in one preferred embodiment is arc welded to the dome housing 70. As discussed below, the arc welding process can involve performing a gas tungsten arc welding (GTAW) or a tungsten inert gas (TIG) welding process circumferentially around the end of the replacement bellows 180 and the mating surface 76 of the dome housing 70. Other welding processes, such as laser welding or fusion welding, can be used to affix the replacement bellows 180 to the mating surface 76.

A standard bellows used in a gas lift valve is composed of a nickel-copper alloy, such as a MONEL® alloy, and brazing is used to attach the bellows to the assembly. In the remanufacture of the used gas lift valve 60, the replacement bellows 180 is composed of a nickel-chromium alloy, such as an INCONEL® alloy, and is (Affixed) arc welded (e.g., TIG welded) to the assembly. MONEL and INCONEL are registered trademarks of HUNTINGTON ALLOYS CORPORATION. The standard bellows of nickel-copper alloy and brazing have been used for a long time and are satisfactory for the originally installed gas lift valve. As seen, failures tend to occur due to leaking from the standard, brazed bellows. Here, the nickel-chromium alloy of the replacement bellows 180 used in the remanufacture process has advantages for a remanufactured gas lift valve 60 of the present disclosure. Additionally, the nickel-chromium alloy of the replacement bellows 180 affixed using arc welding (e.g., TIG welding) has further advantages for a remanufactured gas lift valve 60 of the present disclosure.

To affix the replacement bellows 180, the dome housing 70 is first secured in a lathe, and all of the brazing material still present on the dome housing 70 is removed from the mating surface 76 where the replacement bellows 80 will mate with the dome housing 70. The mating surface 76 is carefully milled to remove any brazing material or filler, and the mating surface 76 for the affixing process is refaced on the dome housing 70. Care is taken not to damage the threads 74 on the dome housing 70 that are close to the mating surface 76 for the bellows 80. To further facilitate affixing the replacement bellows 180 to the dome housing 70, a circumferential groove can be formed about the mating surface 76 of the dome housing 70. After refacing, the mating surface 76 may be narrower and shorter so the replacement bellows 180 can be manufactured with a cuff 181 at its end that has a smaller diameter and depth size.

The dome housing 70 is removed from the lathe and is secured for the appropriate affixing process. In the discussion that follows, arc (TIG) welding is described as the affixing process used. It will be appreciated that the steps described below can be appropriately adapted to other affixing processes, such as brazing, fusion welding, other forms of arc welding, and the like.

For the TIG welding used in the preferred affixing process, the dome housing 70 is secured for the appropriate affixing process fixture (not shown). The mating surface 76 of the housing 70 and the end of the replacement bellows 180 are thoroughly cleaned to remove any foreign residue and oils. The replacement bellows 180 of the nickel-chromium alloy is then secured in the TIG welding fixture. The dome housing 70 and replacement bellows 180 are moved into proper alignment and position using controls of the TIG welding fixture. The TIG welding fixture is programmed and activated to TIG weld the replacement bellows 80 to the dome housing 70 at the connection area of the mating surface 76 and end of the replacement bellows 180.

Figure 11C:
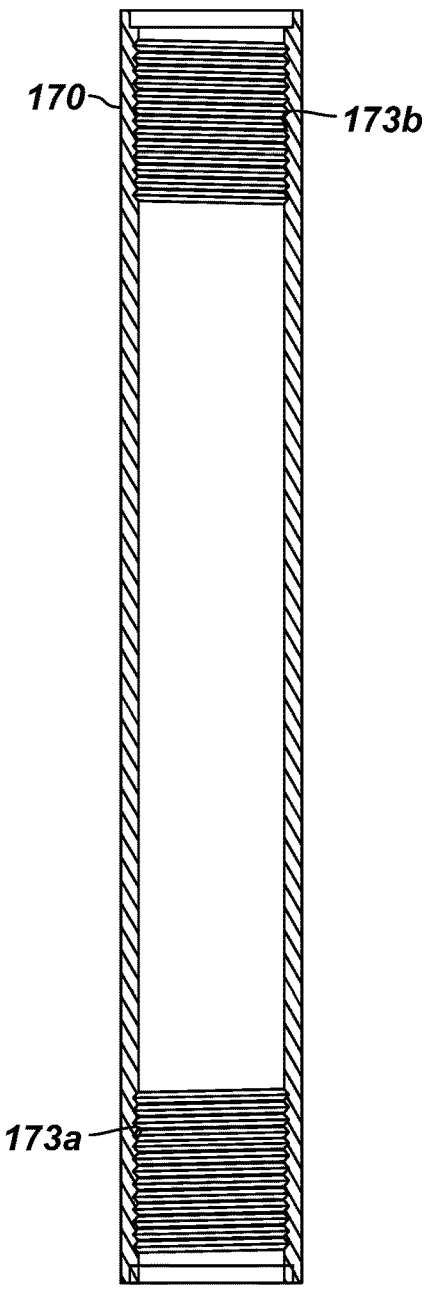
FIG. 11C illustrates a replacement (or modified) dome housing.

Refacing of the existing dome housing 70 in Block 130*a* may not be always be possible and may only be feasibly performed one time on an existing dome housing 70. Accordingly, an alternative step (Block 130*b*) can be used in which a replacement dome housing is provided. This replacement dome housing can have an integrated threaded coupling 74 and mating surface 76 similar to the existing housing 70 so the replacement bellows 180 can be affixed to the new dome housing. Alternatively, the replacement dome housing can be a new housing 170, such as shown in FIG. 11C, having a truncated end with internal thread 173*a*. The replacement bellows 180 can be affixed to a housing adapter 171, such as shown in FIG. 11A, which can be coupled to the new housing 170. The replacement bellows 180 and affixing process for the housing adapter 171 can be similar to the details discussed above, but could use other techniques disclosed herein.

Figures 13A, 13B:
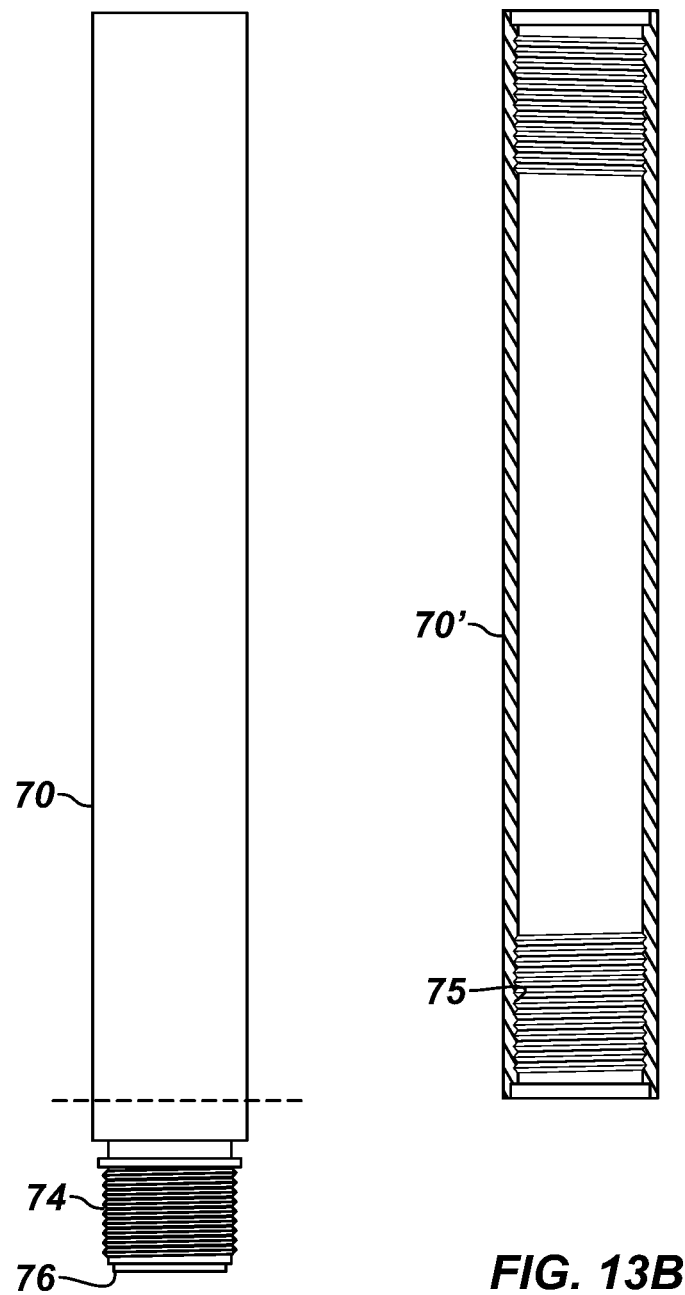
FIG. 13A illustrates an existing dome housing to be modified by truncating the end thereof.
FIG. 13B illustrates the truncated dome housing having threads formed inside the truncated end.

In yet another possible step (Block 130*c*), the existing dome housing 70 as shown in FIGS. 13A-13B can be truncated to remove the integrated threaded coupling 74 and mating surface 76. The truncated dome housing 70' can then be machined to include internal thread 75. The replacement bellows 180 can be affixed to a housing adapter 171 as in FIG. 11A, which can be coupled to the internal thread 75 of the modified dome housing 70'.

Continuing with the remanufacture process 120 of FIG. 4, a bellows adapter is attached or affixed to the second end of the replacement bellows 180 (Block 132). Preferably, a replacement bellows adapter 182 (FIG. 10) is used, although the existing bellows adapter 82 could be used if properly cleaned and resurfaced. The bellows adapter 182 can be affixed in a number of ways to the replacement bellows 180, including brazing, fusion welding, arc welding, and the like. For example, a brazing process similar to that used in the original manufacture of a gas lift valve can be used to affix the bellows adapter 182 to the replacement bellows 180. In contrast to using brazing, the bellows adapter 182 in one preferred embodiment is arc welded to the replacement bellows 80, and the same affixing process used for affixing the replacement bellows 180 to the dome housing 70 is used for affixing the bellows adapter 82 and the replacement bellows 80. As discussed below, the arc welding process can involve performing a gas tungsten arc welding (GTAW) or a tungsten inert gas (TIG) welding process circumferentially around the end of the replacement bellows 180 and the mating surface 184 of the bellows adapter 182. Again, other welding processes, such as laser welding or fusion welding, can be used to affix the replacement bellows 180 to the mating surface 184.

In the discussion that follows, arc (TIG) welding is described as the affixing process used. It will be appreciated that the steps described below can be appropriately adapted to other affixing processes, such as brazing, fusion welding, other forms of arc welding, and the like.

Consistent with the welded attachment of the replacement bellows 180 to the dome housing 70, the replacement bellows adapter 182 is preferably arc welded to the replacement bellows 180. Additionally, although the used bellows adapter 82 could be reused, the remanufacture process 120 preferably replaces the used bellows adapter 82 with a replacement bellows adapter 182. As before, the arc welding process used to attach the replacement bellows adapter 182 to the replacement bellows 180 can involve performing a gas tungsten arc welding (GTAW) or a tungsten inert gas (TIG) welding process circumferentially around the end of the replacement bellows 180 and a mating surface 184 of the replacement bellows adapter 182.

In the welding process to affix the replacement bellows 180 to the replacement bellows adapter 182 of Block 132, the dome housing 70 is kept secured in the TIG welding fixture. The replacement bellows 180 is released from the fixture, and the bellows adapter 182 is secured into the TIG welding fixture. The mating surface 184 of the adapter 182 and the end of the replacement bellows 180 are thoroughly cleaned to remove any foreign residue and oils. The bellows adapter 182 and bellows 180 are moved into proper alignment and welding position using the TIG welding fixture controls. The TIG welding fixture is then programmed and activated to weld the bellows 180 and bellows adapter 182 together.

Once the arc welding process (or other affixing process) is complete, the valve assembly is now remanufactured (Block 134). The valve components are buffed, polished, and reassembled. Proper hydrostatic testing and inspection will ensure all equipment is at or exceeding original manufactured standards.

In particular, the welded assembly having the dome housing (70 or 70'/170 with adapter 171), the replacement bellows 180, and the replacement bellows adapter 182 are secured in an assembly fixture. New elastomeric seals are installed on the dome housing (70 or 70'/170 with adapter 171) and the bellows adapter 182. A new Tungsten Carbide stem (186; FIG. 10) is installed onto the bellows adapter 182; the bellows housing 90 is connected to the dome housing (70 or 70'/170 with adapter 171), and a new Tungsten Carbide seat 88 and snap ring 89 are installed into the seat housing 92. The Tungsten Carbide stem 186 and seat 88 are lapped so they are installed as a matched pair in the valve assembly. The seat housing 92 is installed onto the bellows housing 90; a new elastomeric seal 65 is installed on the dome cap 64, and the dome cap 64 is installed onto the dome housing 70.

High quality, pressure dampening, silicon oil is added into dome housing 70, and a new Schrader valve 66 is installed into dome cap 64. The gas lift valve 60 is secured in a test rack, and the dome housing 70 is filled with Nitrogen to a test pressure, such as 1200-psig. Based on a successful test, the gas lift valve 60 is removed from the test rack and is secured in the assembly fixture so a new tail plug 62 with new elastomeric seals 63*a* and copper crush ring 63*b* can be installed into the dome cap 64.

The remanufactured valve 60 can then go through a quality review (QA/QC) process (Block 136). For example, the remanufactured valve 60 can be placed into a pressure testing fixture (Block 138). The fixture is filled with water ensuring all air is expelled from the fixture. The bleed valves on the fixture are closed, and the pressure in the fixture can be increased to an appropriate level, such as 5,000-psig, and held for a suitable time period, such as 24 hours. When complete, the pressure can be slowly decreased, and all bleed valves can be opened to ensure no trapped pressure exists so that the test fixture can be opened to remove the valves.

The remanufactured valves 60 are placed in a test rack, and the valve opening (dome) pressure is checked for acceptable range, such as 1,100 to 1,200-psig (Decision 140). If the pressure range is not reached, troubleshooting and remedial actions are performed as needed (Block 142).

If the dome pressure range is reached, the remanufactured valves 60 go through a finishing process (Block 144). For example, the remanufactured valves 60 can be laser etched for traceability and inventory purposes. Finally, a check valve assembly (not shown) can be attached to the end of the seat housing 92.

Figure 5:
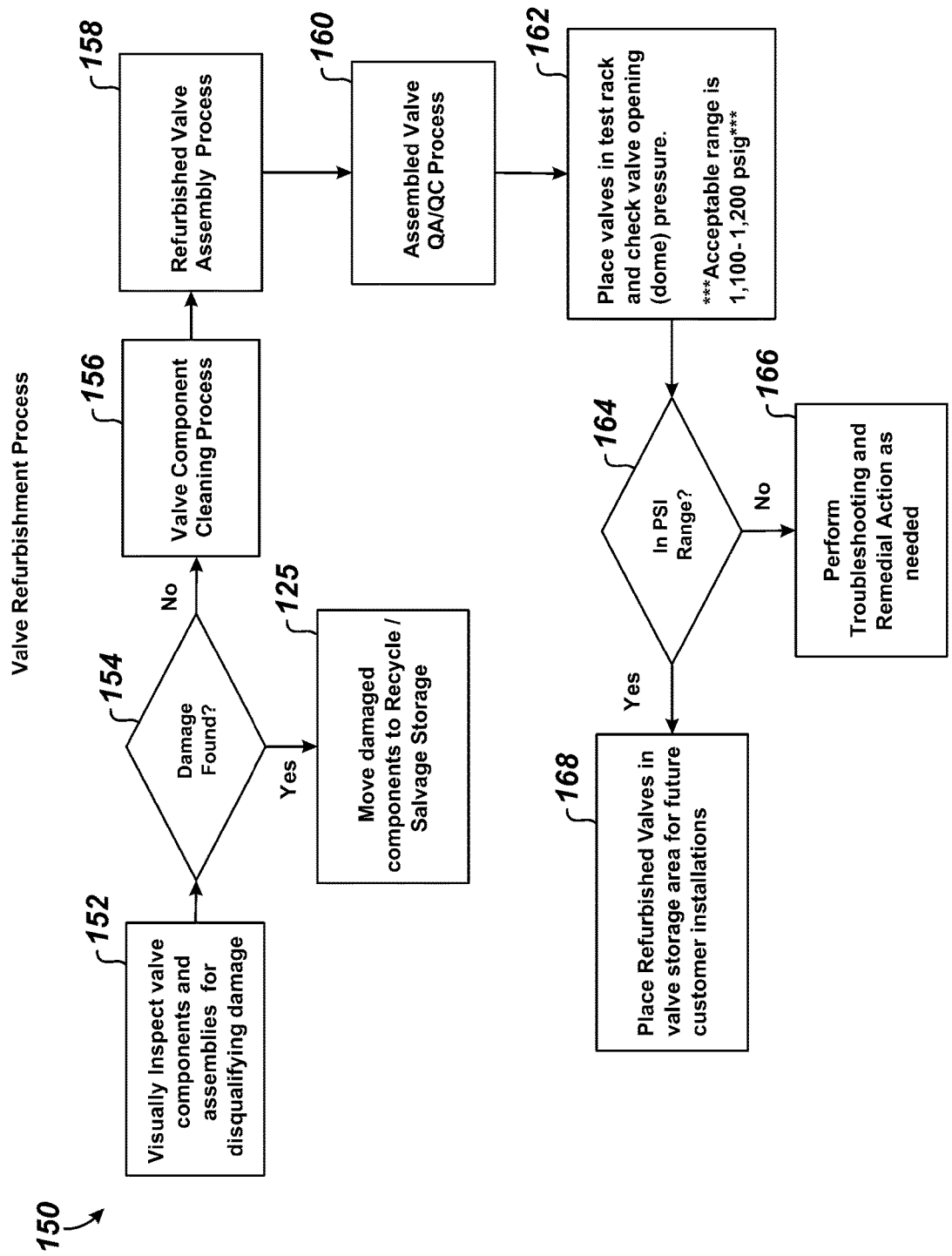
FIG. 5 illustrates a process of disassembling and refurbishing a used gas lift valve.
Figure 7:
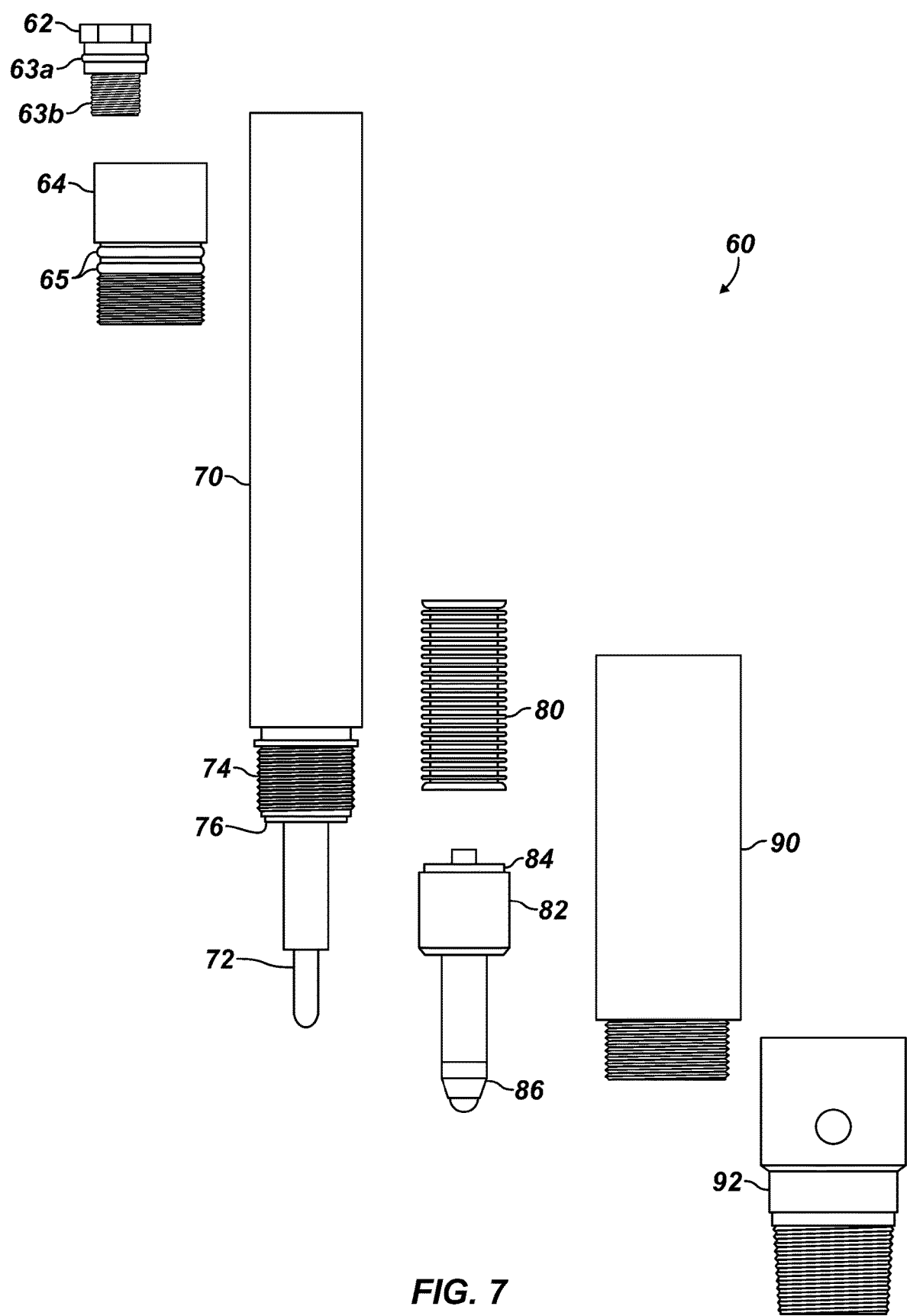
FIG. 7 shows components of the used gas lift valve during disassembly.

FIG. 5 illustrates a process 150 of disassembling and refurbishing a used gas lift valve 60. This refurbishing process 150 has similarities to the remanufacturing process 120 of FIG. 4 except that a replacement bellows 80 is not installed.

As before, the used gas lift valve 60 goes through a disassembly process (Block 152), and the valve components and assemblies are all visually inspected for disqualifying damage (Decision 154). If damage is found, the damaged components are moved to recycle/salvage storage (Block 155). For those components that do not have disqualifying damage, the valve components go through a cleaning process (Block 156).

The valve assembly now goes through a refurbishing process (Block 158). The assembly having the dome housing 70, the bellows 80, and the bellows adapter 82 are secured in an assembly fixture. New elastomeric seals are installed on the dome housing 70 and the bellows adapter 82.

A new Tungsten Carbide stem 86 is installed onto the bellows adapter 82; the bellows housing 90 is installed to the dome housing 70; and a new Tungsten Carbide seat 88 and snap ring 89 are installed into the seat housing 92. The Tungsten Carbide stem 86 and the seat 89 are lapped so they are installed as a matched pair in the valve assembly. The seat housing 92 is installed onto the bellows housing 90; a new elastomeric seal is installed on the dome cap 64; and the dome cap 64 is installed onto the dome housing 70. High-quality, pressure dampening silicon oil is added into dome housing 70, and a new Schrader valve 66 is installed into the dome cap 64. The refurbished gas lift valve 60 is secured in a test rack, and the dome housing 70 is filled with Nitrogen to a test pressure, such as 1200-psig. Based on a successful test, the refurbished gas lift valve 60 is removed from the test rack and secured in the assembly fixture so a new tail plug 62 with new elastomeric seal 63*a* and copper crush ring 63*b* can be installed into the dome cap 64.

The refurbished gas lift valve 60 can then go through a quality review (QA/QC) process (Block 160). For example, the refurbished gas lift valve 60 can be placed into a pressure testing fixture and can be tested to an appropriate level, such as 5,000-psig, for a suitable time period, such as 24 hours. When complete, the refurbished gas lift valves 60 are placed in a test rack, and the valve opening (dome) pressure is checked for acceptable range, such as 1,100 to 1,200-psig (Block 162). If the pressure range is not reached (Decision 164), troubleshooting and remedial actions are performed as needed (Block 166).

If the dome pressure range is reached, the refurbished gas lift valves 60 go through a finishing process (Block 168). For example, the refurbished gas lift valves 60 can be laser etched for traceability and inventory purposes. Finally, a check valve assembly (not shown) can be attached to the end of the seat housing 92.

As disclosed herein, the remanufacture process 120 of FIG. 3 properly de-brazes the bellows assembly (80, 82) from the gas lift valve's dome housing 70 so a replacement bellows assembly (180, 182) can be reattached. The remanufacture process 120 replaces the core components of the valve 60 while being able to reuse, recycle, and repurpose the core body and functioning pieces of the used gas lift valve 60. Therefore, the remanufacture process 120 reduces the overall environmental impact and carbon footprint by recycling and reusing parts and housings of the used gas lift valves 60 instead of requiring operators to purchase entirely new gas lift valves. The remanufactured gas lift valves 60 can therefore reduce operating expenses.

As noted above, the remanufacture process 120 de-brazes and removes the old bellows 80 so a replacement bellows 180 can be attached. Current manufacturers and service providers simply sell refurbished valves or sell newly manufactured gas lift valves. The possibility of remanufacturing a used gas lift valve is not explored at all in the industry due to technical difficulties in remanufacturing a replacement bellows assembly onto existing valve components. The teachings of the present disclosure overcome these difficulties by de-brazing the existing bellows assembly (80, 82) from the dome housing 70, arc welding a replacement bellows 180 of a nickel-chromium alloy to the dome housing (70 or 70'/170 with adapter 171), and arc welding a replacement bellows adapter 182 to the replacement bellows 180.

There are a number of difficulties with the de-brazing process to remove the existing bellows assembly (80, 82). Correct and accurate heat distribution is necessary to ensure that the filler material reaches its melting point and is completely removed from any threads. For this reason, induction heating using an induction heating coil is preferred according to the present disclosure. The mating surfaces must be refaced and cleaned properly to ensure proper and pure welding surfaces for accurate penetration.

In general, brazing takes place above 840-F, and most brazing is performed at temperatures between 1100 and 1500-deg F. As is known, a filler material having a lower melting point than the materials being joined is heated so that the filler material then flows into a joint via capillary action. The heating does not melt the joined material. Brazing is suitable for use with non-similar metals and small parts. The lower temperature used for heating is less likely to warp the components being joined. If the surfaces being joined are not sufficiently clean, the capillary action will not be effective, which can create voids in the connection. This is specifically an issue with gas lift valves as the porosity caused by the poor connection can create a weak point leading to valve failure. Weak points can also be created when the surfaces being joined are not uniformly heated, resulting in "cool" spots that interfere with the capillary action.

To improve the remanufacture of a replacement bellows 180 to the dome housing (70 or 70'/170 with adapter 171), the remanufacture process of the present disclosure uses arc welding instead of brazing to provide the attachment. The welding process used (i.e., gas tungsten arc welding (GTAW) or tungsten inert gas (TIG) welding) is an arc welding process that uses a non-consumable tungsten electrode to produce the weld. The weld area and electrode are protected from oxidation or other atmospheric contamination by an inert shielding gas, such as argon or helium. During the welding process, electrical energy is conducted across an arc through a column of plasma (highly ionized gas and metal vapors). A filler metal is normally used, but autogenous welds or fusion welds do not require a filler metal.

Compared to a standard bellows that has been brazed, the TIG welded bellows 80 of the remanufactured gas lift valve 60 of the present disclosure can have a stronger connection because the mating surfaces are melted together in the TIG welding process. Using automated processes, the likelihood of there being porosity in the weld is low, reducing failure rates and extending the life of the valve.

To improve the remanufacture of a replacement bellows 180 to the dome housing (70 or 70'/170 with adapter 171), the replacement bellows 180 is preferably composed of a nickel-chromium alloy (e.g., INCONEL) rather than a conventional nickel-copper alloy (e.g., MONEL). INCONEL is a family of austenitic nickel-chromium-based superalloys, whereas MONEL is a group of nickel alloys, primarily composed of nickel and copper, with small amounts of iron, manganese, carbon, and silicon. Both MONEL and INCONEL have nickel as their primary metal. However, MONEL has copper and is a nickel-copper alloy, whereas INCONEL has chromium and is a nickel-chromium alloy.

In the end, it can be seen that a used gas lift valve 60 remanufactured by the remanufacture process disclosed herein will include a replacement bellows 180 composed of a different alloy than the original bellows, will include a welded attachment of the replacement bellows 180 to the dome housing (70 or 70'/170 with adapter 171), and will include a welded attachment of the bellows adapter 182 to the replacement bellows 180. These are all structural differences between the remanufactured gas lift valve 60 and an existing configuration of a used gas lift valve or even a refurbished gas lift valve.

In addition to remanufactured gas lift valves 60, the teachings of the present disclosure can be used to produce a replacement bellows subassembly for use in existing valves. The replacement bellows subassembly can include a bellows adaptor, a ball and stem assembly, and a bellows, which are manufactured and assembled according to the steps disclosed above. This replacement bellows subassembly can then be used as a replacement in a gas lift valve. A new cushion rod would likely also be installed.

For example, FIG. 10 illustrates a replacement subassembly having a cushion rod 172, a bellows adapter 182, a bellows 180, a ball and stem assembly 186. Here, the cushion rod 172 has a threaded end configured to thread to a housing adapter (171: FIG. 11A) as disclosed herein, and the rod 172 is configured to insert at least partially in an opening or pocket 185 of the bellows adapter 182. The replacement bellows 180 and bellows adapter 182 can be premanufactured for eventual use in a remanufactured valve.

This replacement subassembly can also be offered separately for others to remanufacture an existing valve.

In an alternative, a more complete subassembly can be manufactured and used for remanufacturing gas lift valves. This replacement subassembly includes an intermediate dome housing adapter 171 shown in FIG. 11A and includes the replacement cushion rod 172, bellows adapter 182, bellows 180, and ball and stem 186 of FIG. 10.

As shown in FIG. 11A, the intermediate dome housing adapter 171 includes an internal bore 177. One end of the intermediate adapter 171 has external thread 174a for affixing to other housing components. The other end has external thread 174b for affixing to other housing components and has a mating surface 176 for affixing to the bellows 180. Internal thread 175 in the bore 177 is used for threading to the cushion rod 172 (FIG. 10). Slots 178 for seals are also provided as needed.

As shown in FIG. 11B, all of the replacement components can be preassembled into a subassembly 190 having the intermediate dome housing adapter 171, cushion rod 172, bellows adapter 182, bellows 180, and ball and stem assembly 186. This replacement subassembly 190 can be premanufactured and used in remanufacturing a gas lift valve.

The bellows 180 as noted herein can be affixed to the mating surface 176 of the intermediate adapter 171 utilizing brazing, TIG welding, or other welding process. The bellows 180 can be made of MONEL alloy, INCONEL alloy, or the like. Likewise as noted herein, the bellows adapter 182 can be affixed to the bellows 180 utilizing brazing, TIG welding, or other welding process.

The intermediate adapter 171 can be threaded with gas-tight thread 174a and elastomer O-rings (not shown) into a dome housing. Additional sets of male threads 174b with an elastomer O-Ring facilitates the threading of a bellows housing onto the adapter 171.

To adapt an existing dome housing (70) to couple to the intermediate adapter 171, the lower end of the existing dome housing (70) can be removed to form a truncated dome housing (70'). Then, the inner chamber can be threaded to accept the upper threaded end 174a of the intermediate adapter 171. This would produce a dome housing 70' as shown in FIG. 13B.

For example, FIG. 13A shows an existing dome housing 70 having an integral end having the external thread 74 and mating surface 76. This integral end can be removed, such as indicated by the dashed line. The remaining dome housing 70' can then be threaded with an internal thread 75 inside the truncated end as shown in FIG. 13B to produce a modified dome housing for use on the re-manufacturable valve.

Further still, instead of modifying an existing dome housing, the replacement dome housing 170 in FIG. 11C can simply be a new component, which has lower internal thread 173a to couple to the upper threaded end 174a of the intermediate adapter 171 and has upper internal thread 173b to couple to other valve components.

Previous examples have shown a cushion rod that affixes to the housing adapter 171 for the dome housing 170 as in FIG. 10. The distal end of the cushion rod 172 extends from the mating surface 176 and passes through an opening 185 in the bellows adapter 182. Other configurations are possible, such as used on a larger gas valve, such as 1½ inch valve. For example, FIG. 14A shows a bellows 180, a bellows adapter 182, and a stem 186 according to another configuration of the present disclosure. The bellows adapter 182 has a cushion rod 188 extending from the mating surface 184. The bellows 180 affixes to the mating surface 184 of the bellows adapter 182 as before, and the stem 186 affixes to the bellows adapter 182.

The subassembly of FIG. 14A is used with a dome adapter 171 as shown in FIG. 14B, which threads to a threaded end of a dome housing (70' or 170) as noted above. This housing adapter 171 has a passage 179 for the cushion rod 188. The upper end 181 of the bellows 180 affixes to the mating surface 176 of this housing adapter 171 as before. In the end, an assembly 190 as in FIG. 14C can be produced for use in the valves disclosed herein.

Figure 12:
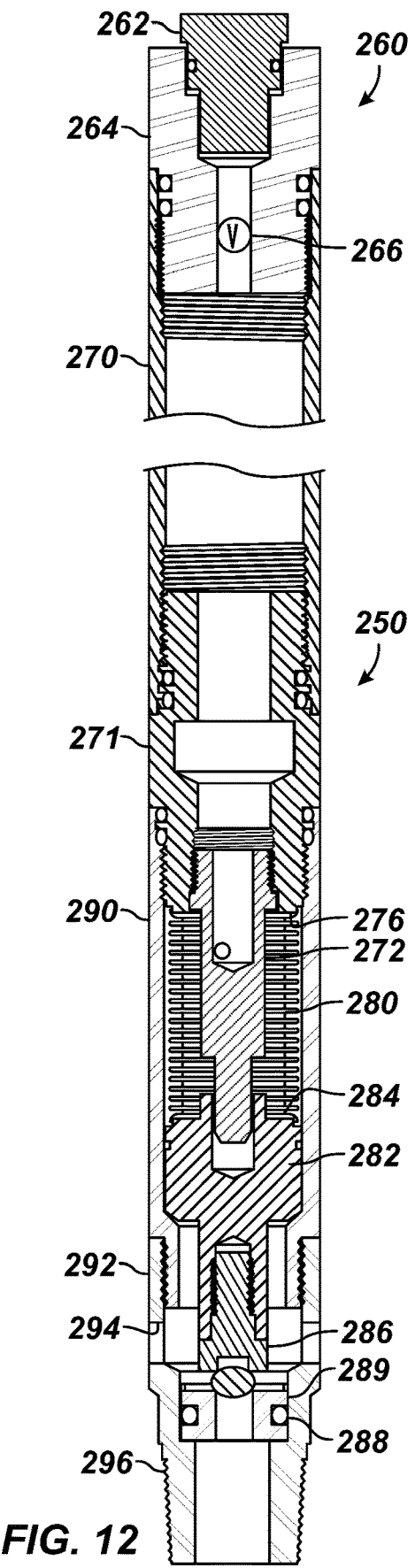
FIG. 12 illustrates a remanufacturable gas lift valve configured for remanufacture according to the present disclosure.

Finally, the teachings of the present disclosure can be used to manufacture an original, re-manufacturable gas lift valve 260 as shown in FIG. 12 that is particularly configured for remanufacture. The remanufacturable gas lift valve 260 includes a tail plug 262, a dome cap 264, a pressure valve 266, a dome housing 270, an intermediate dome housing adapter 271, a cushion rod 272, a bellows 280, a bellows adapter 282, a stem 286, a seat 288, a bellows housing 290, and a seat housing 292. Once the gas lift valve 260 has been used downhole and retrieved for reuse, operators can inspect the valve for reuse or remanufacture. The subassembly 250 of the intermediate dome housing adapter 271, the cushion rod 272, the bellows 280, the bellows adapter 282, the stem 286 can be removed wholesale from the other components of the valve 260, which can be inspected and cleaned. Then, a replacement subassembly 190 as in FIG. 11B of these components can be installed with the existing, refurbished components so the re-manufacturable gas lift valve 260 can be ready for reuse.

As can be seen, the remanufacturable gas lift valve 260 is designed to facilitate easy remanufacturing, thus reducing the carbon footprint through the re-use of valve components. The subassembly 250 is designed to thread into the dome housing 270 allowing it to be easily replaced during the remanufacturing process.

As noted in the background of the present disclosure, current gas lift valves 60 are configured to inhibit the remanufacture of the valves 60. Increasing focus on environmental issues such as carbon footprint makes remanufacturing a beneficial step forward in the gas lift industry. The remanufacturable gas lift valves 260 disclosed herein can enable operators to re-use the valves 260 multiple times with the reassurance brought by replacing the bellows. This will greatly reduce carbon footprint and create confidence in the remanufactured gas lift market.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A method of remanufacturing a used gas lift valve having a used bellows assembly, the used bellows assembly having a used bellows brazed to a used dome housing of the used gas lift valve and having a used bellows adapter brazed to the used bellows, the method comprising:

disassembling separable components of the used gas lift valve;

removing the used bellow assembly from the used dome housing by de-brazing the used bellows at a brazed joint from a mating surface of the used dome housing;

affixing a replacement bellows to a given mating surface of a given dome housing in a first affixing process;

affixing the replacement bellows to a given mating surface of a given bellows adapter in a second affixing process; and reassembling the separable components of the used gas lift valve.

2. The method of claim 1, wherein affixing the replacement bellows to the given mating surface of the given dome housing in the first affixing process comprises:

arc welding the replacement bellows to the given mating surface of the given dome housing in an arc welding process for the first affixing process.

3. The method of claim 2, wherein arc welding the replacement bellows to the given mating surface of the given dome housing comprises replacing the used bellows composed of a nickel-copper alloy by selecting the replacement bellows composed of a nickel-chromium alloy.

4. The method of claim 2, wherein arc welding the replacement bellows to the given mating surface of the given dome housing comprises performing a gas tungsten arc welding (GTAW) or a tungsten inert gas (TIG) welding process circumferentially around an end of the replacement bellows and the given mating surface of the given dome housing.

5. The method of claim 1, wherein removing the used bellow assembly from the used dome housing by de-brazing the used bellows at the brazed joint from the mating surface of the used dome housing comprises heating the brazed joint using induction heating centered thereabout.

6. The method of claim 1, wherein affixing the replacement bellows to the given mating surface of the given dome housing comprises:

refacing a de-brazed mating surface of the used dome housing; and affixing the replacement bellows to the refaced mating surface of the used dome housing.

7. The method of claim 1, wherein affixing the replacement bellows to the given mating surface of the given dome housing comprises:

replacing the used dome housing with a replacement dome housing having an integrated coupling with an integrated mating surface; and affixing the replacement bellows to the integrated mating surface of the replacement dome housing.

8. The method of claim 1, wherein affixing the replacement bellows to the given mating surface of the given dome housing comprises:

replacing the used dome housing with a replacement dome housing having an internal thread on an end thereof; and affixing the replacement bellows to a mating surface of a housing adapter.

9. The method of claim 1, wherein affixing the replacement bellows to the given mating surface of the given dome housing comprises:

truncating an end from the used dome housing;

forming internal thread in the truncated end of the used dome housing; and affixing the replacement bellows to a mating surface of a housing adapter configured to thread to the internal thread formed in the used dome housing.

10. The method of claim 1, wherein the first affixing process is the same as or different from the second affixing process.

11. The method of claim 1, wherein affixing the replacement bellows to the given mating surface of the given bellows adapter comprises:

refacing a de-brazed mating surface of the used bellows adapter, and affixing the replacement bellows to the refaced mating surface of the used bellows adapter.

12. The method of claim 1, wherein affixing the replacement bellows to the given mating surface of the given bellows adapter in the second affixing process comprises:

arc welding the replacement bellows to the given mating surface of the given bellows adapter in an arc welding process for the second affixing process.

13. The method of claim 1, wherein reassembling the separable components of the used gas lift valve comprises one or more of:

replacing elastomeric seals for connections of the separable components;

installing a replacement pressure valve in the given dome housing;

installing a replacement stem on the given bellows adapter;

replacing a used seat in the gas lift valve with a replacement seat; and pressure testing the reassembled gas lift valve to a pressure test level.

14. The method of claim 1, wherein disassembling the separable components of the used gas lift valve comprises:

inspecting the disassembled separable components for disqualifying damage and replacing accordingly; and/or determining that the used gas lift valve is suited for remanufacture or refurbishment.

15. The method of claim 1, wherein affixing the replacement bellows to the given mating surface of the given dome housing in the first affixing process comprises brazing the replacement bellows to the given mating surface of the given dome housing in a brazing process for the first affixing process.

16. The method of claim 1, wherein affixing the replacement bellows to the given mating surface of the given dome housing in the first affixing process comprises fusion welding the replacement bellows to the given mating surface of the given dome housing in a fusion welding process for the first affixing process.

17. The method of claim 1, wherein affixing the replacement bellows to the given mating surface of the given dome housing in the first affixing process comprises laser welding the replacement bellows to the given mating surface of the given dome housing in a laser welding process for the first affixing process.

18. The method of claim 1, wherein affixing the replacement bellows to the given mating surface of the given bellows adapter comprises replacing the used bellows adapter with a replacement bellows adapter, and affixing the replacement bellows to a mating surface of the replacement bellows adapter.

19. The method of claim 1, wherein affixing the replacement bellows to the given mating surface of the given bellows adapter in the second affixing process comprises brazing the replacement bellows to the given mating surface of the given bellows adapter in a brazing process for the second affixing process.

20. The method of claim 1, wherein affixing the replacement bellows to the given mating surface of the given bellows adapter in the second affixing process comprises fusion welding the replacement bellows to the given mating surface of the given bellows adapter in a fusion welding process for the second affixing process.

21. The method of claim 1, wherein affixing the replacement bellows to the given mating surface of the given bellows adapter in the second affixing process comprises laser welding the replacement bellows to the given mating surface of the given bellows adapter in a laser welding process for the second affixing process.

* * * * *